(12) United States Patent
Shibata et al.

(10) Patent No.: US 8,435,692 B2
(45) Date of Patent: May 7, 2013

(54) FUEL CELL

(75) Inventors: Soichi Shibata, Osaka (JP); Susumu Hatano, Shiga (JP); Hiroki Kusakabe, Osaka (JP); Eiichi Yasumoto, Kyoto (JP); Toshihiro Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 736 days.

(21) Appl. No.: 12/598,515

(22) PCT Filed: Dec. 26, 2008

(86) PCT No.: PCT/JP2008/004019
§ 371 (c)(1),
(2), (4) Date: Nov. 2, 2009

(87) PCT Pub. No.: WO2009/084230
PCT Pub. Date: Jul. 9, 2009

(65) Prior Publication Data
US 2010/0136460 A1    Jun. 3, 2010

(30) Foreign Application Priority Data

Dec. 28, 2007 (JP) ................. 2007-340301

(51) Int. Cl.
*H01M 2/00* (2006.01)
*H01M 8/24* (2006.01)
(52) U.S. Cl.
USPC ............................ 429/454; 429/508; 429/513
(58) Field of Classification Search .......... 429/508, 429/454, 490, 513
See application file for complete search history.

(56) References Cited

U.S. PATENT DOCUMENTS

2005/0238945 A1    10/2005  Fukuda et al.
2008/0182151 A1*   7/2008   Mizusaki et al. ............... 429/34

FOREIGN PATENT DOCUMENTS

| JP | 07-282836   | 10/1995 |
| JP | 08-130028   | 5/1996  |
| JP | 10-012262   | 1/1998  |
| JP | 2000-090954 | 3/2000  |
| JP | 2002-352830 | 12/2002 |
| JP | 2005-317310 | 11/2005 |
| JP | 2007-294330 | 11/2007 |

OTHER PUBLICATIONS

JP10-012262 A (Fujita) Jun. 25, 1996 (English language machine translation of document cited in IDS dated Nov. 2, 2009). [online] [retrieved Aug. 21, 2012]. Retrieved from: Advanced Industirall Property Network Japan Patent Office.*

* cited by examiner

*Primary Examiner* — Joseph S Del Sole
*Assistant Examiner* — Erin Snelting
(74) *Attorney, Agent, or Firm* — McDermott Will & Emery LLP (57) ABSTRACT

An object of the present invention is to provide a fuel cell including a reaction gas supply path which makes it difficult to cause water condensation in a region near an end plate. A fuel cell of the present invention comprises a cell stack 2 having a reaction gas passage 13a inside thereof and having on one end surface thereof a reaction gas supply inlet 17 from which a reaction gas is supplied to the reaction gas passage 13a, a joint 5 connecting the reaction gas supply inlet 17 to an external pipe P for supplying the reaction gas, plate-shaped end members 3, 4 which are disposed on one end surface of the cell stack 2 and have through-holes 21, 23 into which the joint 5 is inserted so as not to contact inner wall surfaces thereof, and a closing member 9 for substantially closing a space formed between the joint 5 and the inner wall surfaces of the through-holes 21, 23.

8 Claims, 12 Drawing Sheets

FUEL CELL

RELATED APPLICATIONS

This application is the U.S. National Phase under 35 U.S.C. §371 of International Application No. PCT/JP2008/004019, filed on Dec. 26, 2008, which in turn claims the benefit of Japanese Application No. 2007-340301, filed on Dec. 28, 2007, the disclosures of which Applications are incorporated by reference herein.

TECHNICAL FIELD

The present invention relates to a fuel cell. More particularly, the present invention relates to a fuel cell having a mechanism for preventing flooding.

BACKGROUND ART

Figure 11:
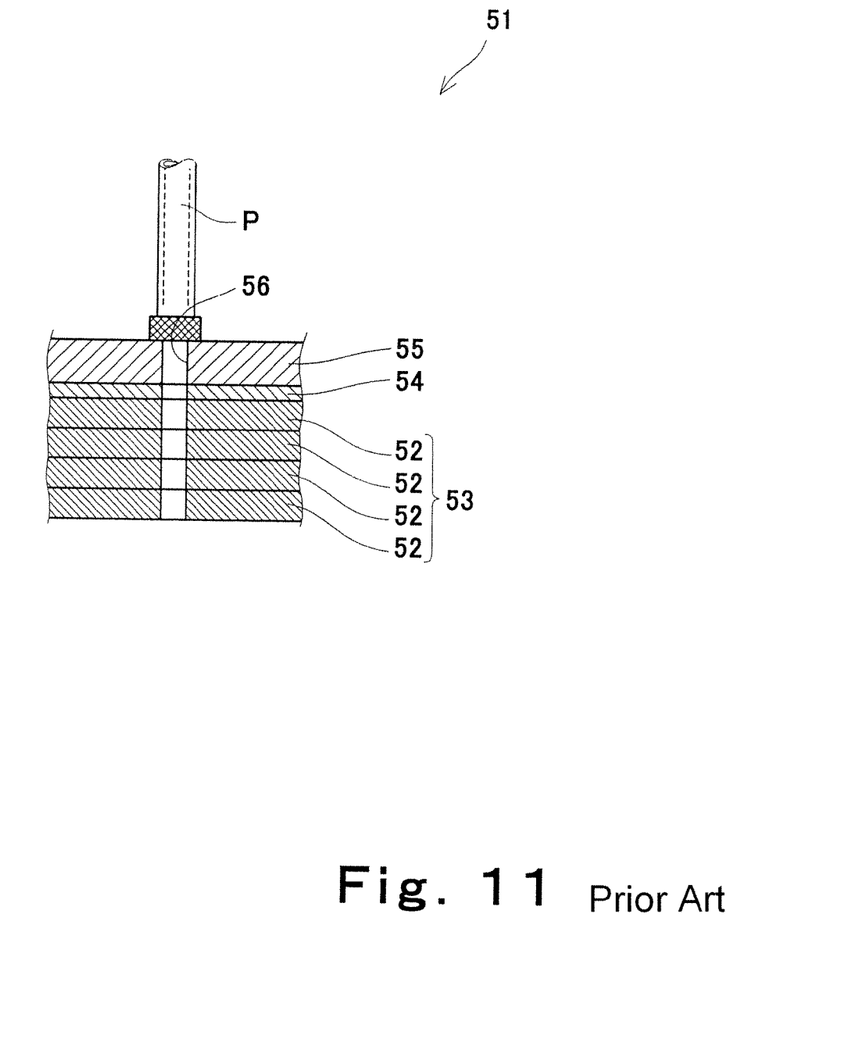
FIG. 11 is a view showing a conventional fuel cell.

Fuel cells generate electric power and heat simultaneously through an electrical chemical reaction between a fuel gas containing hydrogen and an oxidizing gas containing oxygen, such as air. The fuel cells are classified into various kinds according to a fuel or material used. One example is a polymer electrolyte fuel cell using a polymer electrolyte membrane. FIG. 11 is an enlarged view of an end portion of a conventional polymer electrolyte fuel cell 51. The polymer electrolyte fuel cell 51 includes a cell stack 53 in which plural cells 52 each containing the polymer electrolyte membrane are stacked, current collectors 54 are provided at both ends of the cell stack 53, and end plates 55 are provided outside the current collectors 54. They are fastened by tightening them from both sides by bolts. A reaction gas supply inlet 56 is provided at an end surface of the fuel cell 51 to supply reaction gases (fuel gas and oxidizing gas) required for power generation and an external pipe P is connected to the reaction gas supply inlet 56 to feed the reaction gases.

The polymer electrolyte membrane included in the polymer electrolyte fuel cell 51 must always maintain a wet state to keep ion conductivity. Typically, at least one of the fuel gas and the oxidizing gas (hereinafter these are referred to as reaction gases) which contact the polymer electrolyte membrane is humidified and then is supplied to the fuel cell 51. In this case, the reaction gas is humidified to a state which is close to a saturated state. Therefore, performance degradation phenomenon called "flooding" occurs, in which if the temperature of the pipe in a path is lower than the temperature of the reaction gas, water condensation occurs, impeding supply of the reaction gas and reducing a power generation voltage.

By winding a heat-insulating material around the external pipe P, the water condensation within the pipe can be prevented. However, the heat insulating material cannot be wound around a portion inside the fuel cell 51, and consequently, water condensation may occur depending on the use condition. Basically, at the start-up of the fuel cell 51, the temperature of the interior (i.e., cell stack 53) is increased up to 60 to 90 degrees centigrade. This may possibly avoid the water condensation inside the fuel cell 51. Actually, the end plate 55 which is located at an outermost side and has a large thickness cannot increase in temperature according to an temperature increase in the interior of the fuel cell (cell stack 53) and a low-temperature state continues immediately after the start-up. For this reason, water condensation occurs inside a portion of a path in the vicinity of the end plate 55.

Figure 12A:
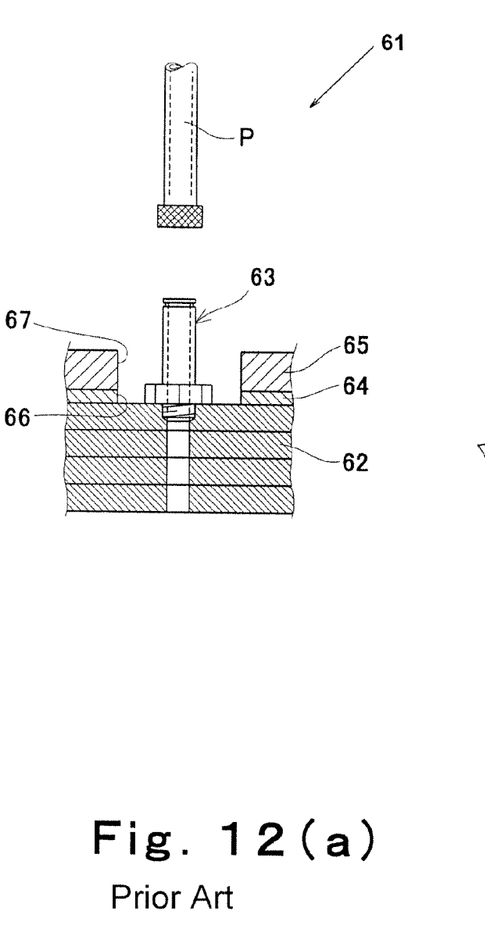
FIG. 12 is a view showing a conventional fuel cell.
Figure 12B:
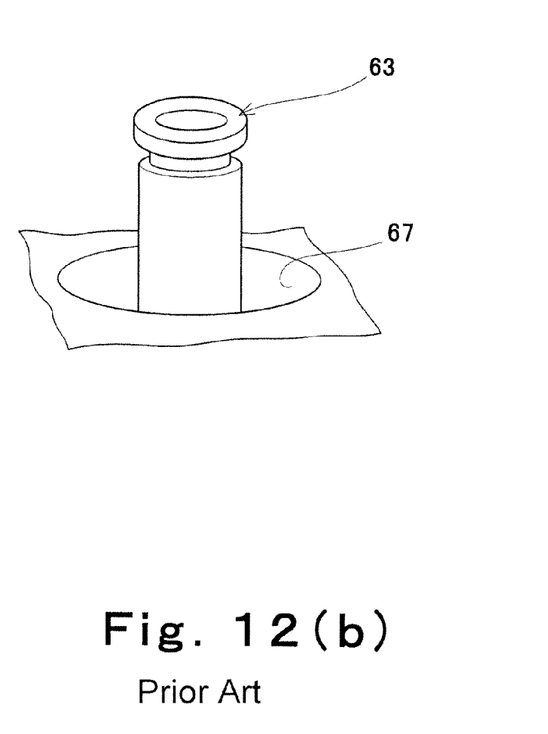

Under the circumstance, in order to prevent water condensation in the vicinity of the end plate, a fuel cell is proposed, having a structure for connecting an external pipe to a cell stack via a joint, instead of connecting the external pipe to the end plate (e.g., see FIG. 3 in patent document 1). FIG. 12 is an enlarged view of an end surface portion of a fuel cell 61 having the above described structure, in which FIG. 12(a) is a cross-sectional view and FIG. 12(b) is a perspective view. As shown in FIG. 12, the fuel cell 61 includes a joint 63 connecting a cell stack 62 to an external pipe P. A current collector 64 and an end plate 65 have a through-hole 66 and a through-hole 67, respectively, which have a larger diameter than the joint 63 so that the joint 63 does not contact the end plate 65. In such a structure, since the joint 63 does not contact the end plate 65, it is possible to prevent water condensation within the reaction gas path (within the joint 63) which may be caused by contact with the end plate 65.

Patent document 1: Japanese Laid-Open Patent Application Publication No. Hei. 7-282836

DISCLOSURE OF THE INVENTION

Problems to be Solved by the Invention

However, it is difficult to wind a heat-insulating material around the joint 63 of the fuel cell 61 shown in FIG. 12 because of a low operation efficiency. Therefore, a large part of the joint 63 is in contact with outside air entering a gap between the joint 63 and the end plate 65. For this reason, in winter season, or at cold places such as high places and high-latitude places, the joint 63 is cooled by the outside air, causing water condensation inside the joint 63 (reaction gas path).

The present invention has been made to solve the above described problem, and an object of the present invention is to provide a fuel cell including a reaction gas supply path which makes it difficult to cause water condensation in a region near an end plate.

Means for Solving the Problem

To solve the above described problem, a fuel cell of the present invention comprises a cell stack having a reaction gas passage inside thereof and having on one end surface thereof a reaction gas supply inlet from which a reaction gas is supplied to the reaction gas passage; a joint connecting the reaction gas supply inlet to an external pipe for supplying the reaction gas; a plate-shaped end member which is disposed on one end surface of the cell stack and has a through-hole into which the joint is inserted so as not to contact an inner wall surface thereof; and a closing structure for substantially closing a space formed between the joint and the inner wall surface of the through-hole.

As used herein, the term "end member" refers to a member located in the vicinity of an end portion of the fuel cell, and includes a combination of an end plate (including an insulating plate) and a current collector, as well as the end plate (including the insulating plate). In accordance with the above structure, since the substantially closed space is formed between the joint and the through-hole, thermal movement from the joint to the outside air can be suppressed, and thus a temperature decrease of the joint can be prevented. Therefore, in accordance with such a structure, it is possible to provide a fuel cell including the reaction gas supply path which makes it difficult to cause water condensation in a region near the end plate. As used herein, the term "substantially closed space" refers to a space which is sealed so as to prevent convection of the outside air, and does not always mean a space having perfect air-tightness.

In the fuel cell, a portion of the end member which surrounds the through-hole may protrude outward. In accordance with such a structure, since the substantially closed space can be extended up to a region near the external pipe to attain a larger size, the portion of the joint which contacts the outside air can be reduced.

The fuel cell may further comprise a closing member formed annularly so as to surround the joint inside the through-hole, and the closing member may form the closing structure.

In the fuel cell, the through-hole may have a small-diameter portion having an inner diameter smaller than an inner diameter of a portion of the through-hole which is other than the small-diameter portion, and the small-diameter portion may form the closing structure. In accordance with such a structure, the number of components and members can be reduced.

In the fuel cell, the joint may have a large-diameter portion having an outer diameter larger than an outer diameter of a portion of the joint which is other than the large-diameter portion, and the large-diameter portion may have the closing structure. In accordance with such a structure, also, the number of components and members can be reduced.

In the fuel cell, a base end portion of the joint may have a flat-plate shape and the base end portion is sandwiched between the cell stack and the end member. In such a structure, since heat is easily transmitted from the cell stack to the joint, a temperature increase of the joint can be facilitated or a temperature decrease of the joint can be suppressed.

The fuel cell may further comprise a gas seal member provided between the end member and the joint such that the gas seal member is located outward relative to the substantially closed space. In accordance with such a structure, since movement of gases between inside and outside the closing portion is further suppressed, heat insulative ability is improved. In addition, since the gas seal member serves as a buffering member, vibration resistance is improved.

Effects of the Invention

In accordance with the present invention, it is possible to provide a fuel cell including a reaction gas supply path which makes it difficult to cause water condensation in a region near an end plate.

DESCRIPTION OF REFERENCE NUMERALS 1, 1A to 1F fuel cell
2 cell stack
3 current collector
4 end plate
5 to 8 joint
5a cell stack connecting portion
5b external pipe connecting portion
9 closing member
13a reaction gas passage
17 reaction gas supply inlet
23 through-hole
24 gap (space)
25 external annular portion
26 small-diameter portion
27 large-diameter portion
P external pipe

BEST MODE FOR CARRYING OUT THE INVENTION

Hereinafter, preferred embodiments of the present invention will be described with reference to the drawings. Throughout the drawings, the same or corresponding constituents are designated by the same reference numerals and description of them will not be given repetitively.

Embodiment 1

Embodiment 1 of the present invention will be described with reference to FIGS. 1 to 4.

Figure 1:
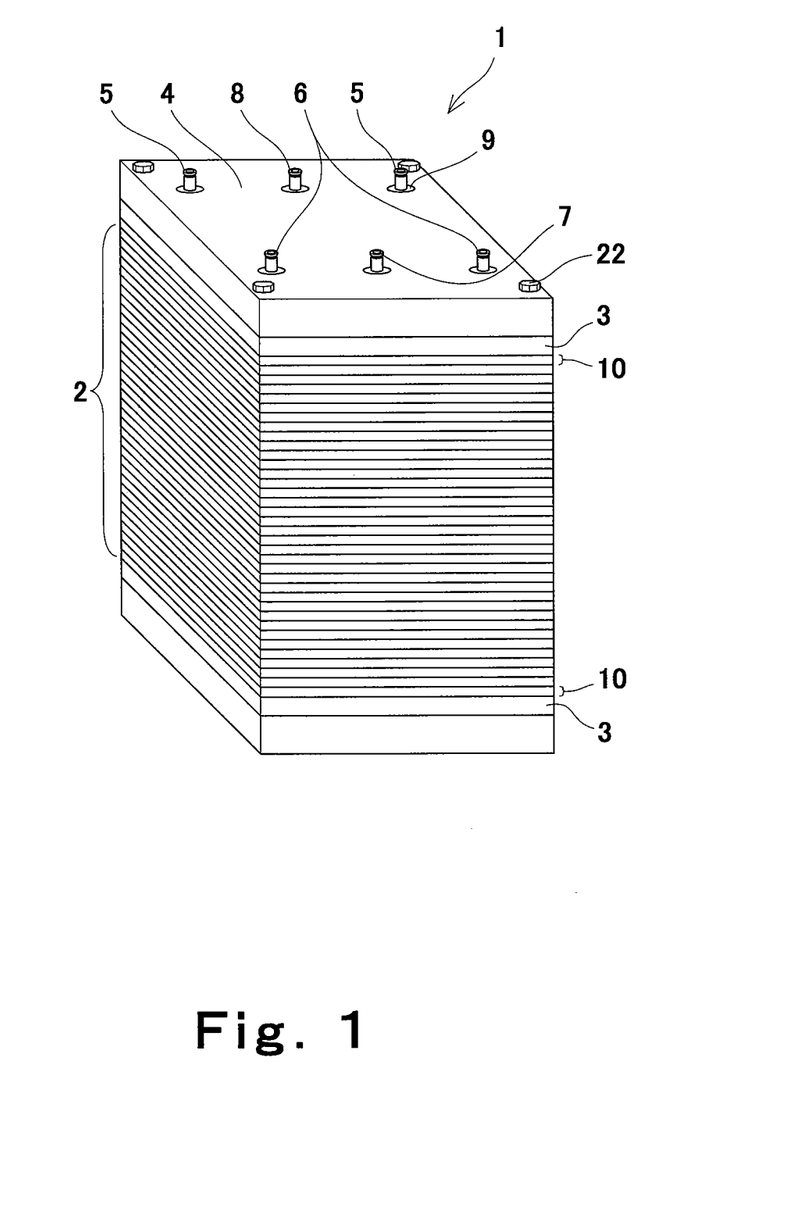
FIG. 1 is a schematic view of a fuel cell according to Embodiment 1.
Figure 2:
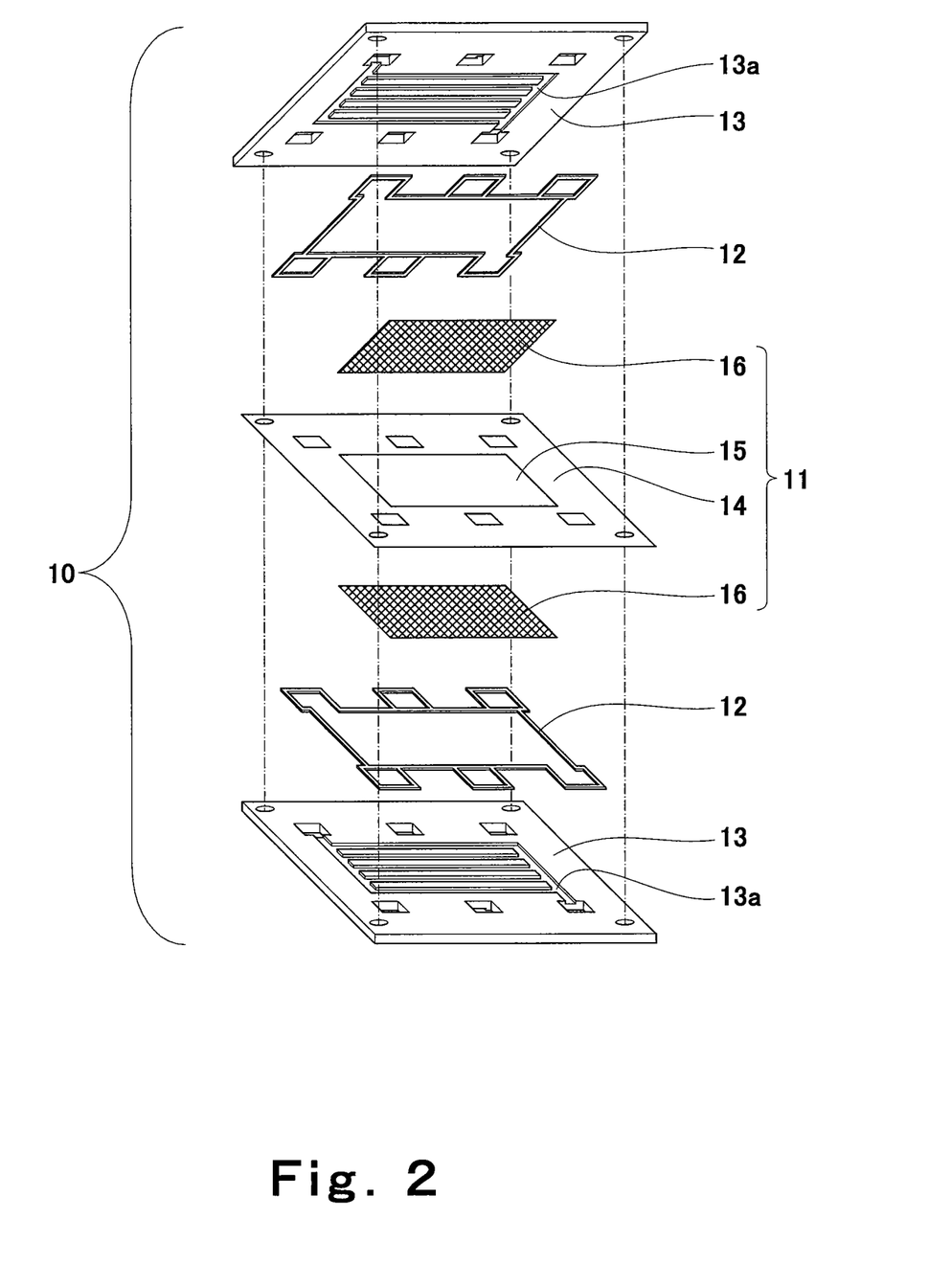
FIG. 2 is an exploded perspective view of a cell according to Embodiment 1.

First of all, a fuel cell 1 according to Embodiment 1 will be described with reference to FIGS. 1 to 3. FIG. 1 is a perspective view of a fuel cell 1 according to Embodiment 1. As shown in FIG. 1, the fuel cell 1 of Embodiment 1 comprises a cell stack 2, current collectors 3, end plates 4, joints 5 to 8, and closing members 9.

The cell stack 2 is formed to include plural cells 10 which are stacked. Typically, about 2 to 200 cells 10 are stacked to form the cell stack 2, according to a desired output electric power. FIG. 2 is an exploded perspective view of the cell 10 according to Embodiment 1. Each cell includes a MEA (Membrane Electrode Assembly) 11, gas seals 12 and separators 13.

The MEA 11 has a structure in which catalyst layers 15 are provided on both sides of a polymer electrolyte membrane 14 and gas diffusion layers 16 are stacked outside the catalyst layers 15. The polymer electrolyte membrane 14 is formed by a cation exchange resin which selectively transports hydrogen ions. The catalyst layer 15 contains as a major component carbon powder carrying metal such as platinum, having a catalytic function. The gas diffusion layer 16 has gas permeability of the reaction gases (fuel gas and oxidizing gas) and electron conductivity. Hereinafter, the catalyst layer 15 and the gas diffusion layer 16 are collectively referred to as electrodes.

The gas seals 12 have an annular shape and are disposed on the outer surfaces of the MEA 11 so as to surround the electrodes (15, 16). The gas seals 12 serve to prevent leak of a fuel gas and an oxidizing gas to outside and mixing between different gases.

The separators 13 are respectively disposed outside the gas seals 12 and the electrodes (15, 16). The separators 13 are provided with channels on both surfaces. Among the channels, a channel 13a formed on an inner surface serves to supply the reaction gas (fuel gas or the oxidizing gas) to the catalyst layer 15, while a channel formed on an outer surface serves to flow cooling water between the cells 10. The separator 13 has electric conductivity and is capable of electrically connecting adjacent MEAs 11 to each other. Whereas in Embodiment 1, heat generated in the MEA 11 is removed using the cooling water, the MEA 11 may be cooled using a cooling fin or a heat transmission pipe.

The upstream end of each channel formed on the separator 13 is connected to a supply manifold hole, while the downstream end thereof is connected to a discharge manifold hole. Manifold holes are formed on the peripheral portion of the MEA 11 to respectively correspond to the manifold holes of the separator 13. When the separators 13 and the MEAs 11 are assembled into the cell stack 2, the manifold holes of the separators 13 and the manifold holes of the MEAs 11 are connected to each other to form manifolds (passages) of fluids. The cell stack 2 according to Embodiment 1 is provided with two reaction gas supply manifolds, two reaction gas discharge manifolds, one cooling water supply manifold, and one cooling water discharge manifold which are formed in this way so as to extend in a direction in which they are stacked. One ends of the two reaction gas supply manifolds form two reaction gas supply inlets, the two reaction gas discharge manifolds form two reaction gas discharge outlets, one end of the cooling water supply manifold forms a cooling water supply inlet, and one end of the cooling water discharge manifold forms a cooling water discharge outlet.

Figure 3:
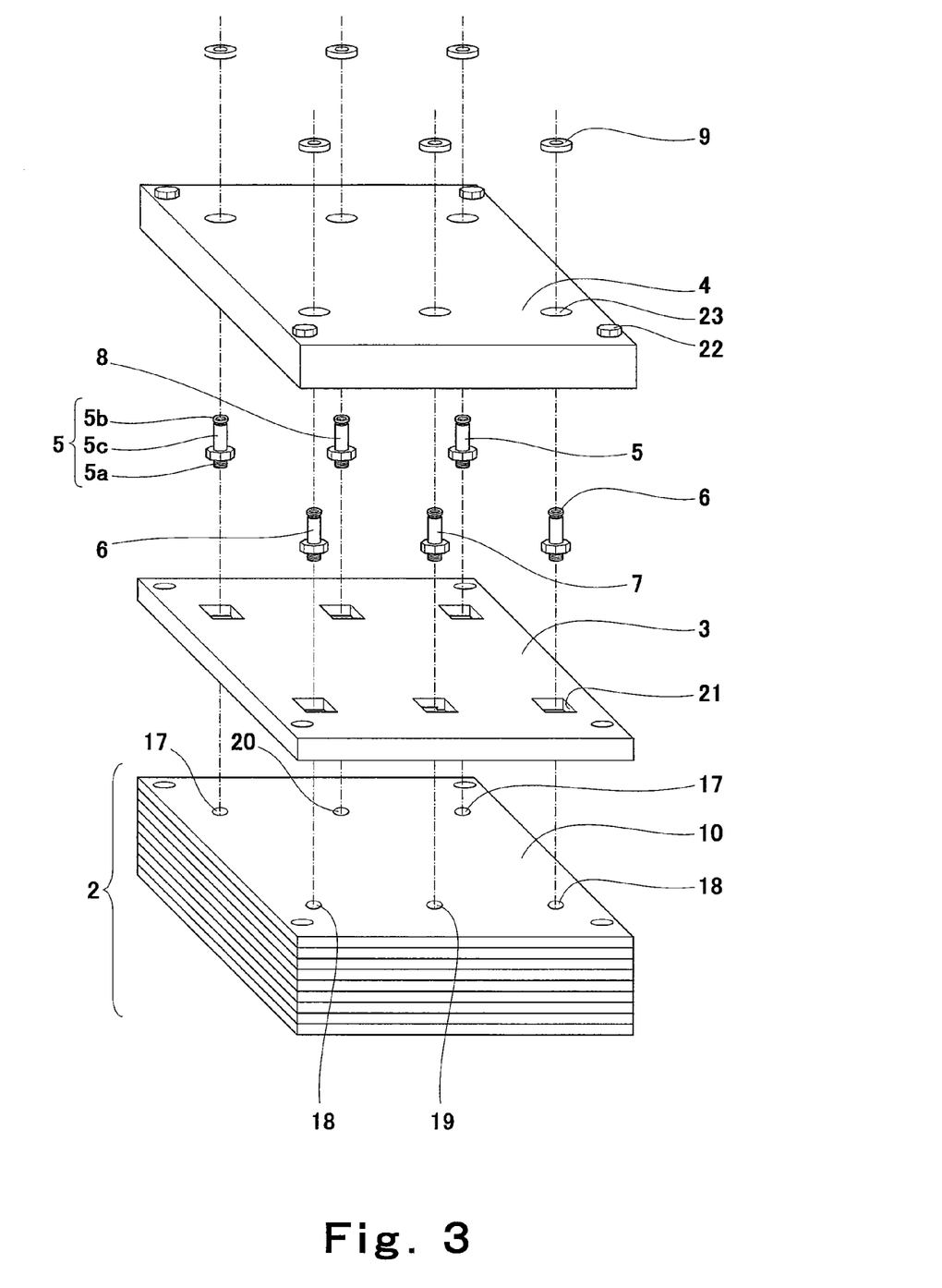
FIG. 3 is an exploded perspective view of a fuel cell according to Embodiment 1.

FIG. 3 is an exploded perspective view of the fuel cell 1 according to Embodiment 1. As described above, since plural passages are formed inside the cells 10 (separators 13), it is necessary to form in the passages supply inlets used for supplying the reaction gases (fuel gas and oxidizing gas) and the cooling water and discharge outlets used for discharging the reaction gases and the cooling water. Accordingly, as shown in FIG. 3, as described above, two reaction gas supply inlets 17 to which the reaction gases are supplied, two reaction gas discharge outlets 18 from which the reactions gases are discharged, one cooling water supply inlet 19 to which the cooling water is supplied and one cooling water discharge outlet 20 from which the cooling water is discharged are formed on one end surface of the end surfaces of the cell stack 2 (outer surface of the separator 13 in the cell located at outermost side). The reaction gases and the cooling water which enter through the supply inlets 17 and 19, pass through inside or boundary of the cells 10, and are discharged from the discharge outlets 18 and 20.

The current collectors 3 are disposed at both sides of the cell stack 2 and serve to allow good electric contact between the cells and an external circuit. As shown in FIG. 3, one of the two current collectors 3 is provided with rectangular through-holes 21 in locations respectively corresponding to the supply inlets 17 and 19 and the discharge outlets 18 and 20 which are provided in the cell stack 2. The joints 5 to 8 are respectively inserted into the through-holes 21.

The end plates 4 are respectively disposed outside the current collectors 3 and serve to sandwich the cell stack 2 and the current collectors 3 from both sides and fasten them. Bolts 22 (threaded portions are omitted in FIGS. 1 and 3) are used as fastener means for fastening the cell stack 2 and the current collectors 3. The length of the bolts 22 used here is substantially equal to the length of the fuel cell 1 in the direction in which the cells are stacked. The bolts 22 are inserted into the bolt through-holes of one end plate 4, through the inside the current collector 3 and the cell stack 2, and through the bolt through-holes of the other end plate 4 and are attached to nuts (not shown) located outside, fastening the entire fuel cell 1. The end plates 4 which must press the entire fuel cell 1 firmly from both sides are required to have high stiffness. Therefore, the end plates 4 are required to have a certain thickness. As in the case of the current collectors 3, one of the two end plates 4 is provided with circular through-holes 23 in locations respectively corresponding to the supply inlets 17 and 19 and the discharge outlets 18 and 20 which are provided on the cell stack 2. The joints 5 to 8 are respectively inserted into the through-holes 23. The end plate 4 is formed by, for example, resin and is insulative. The end plate 4 is formed by a single member but may be formed by an insulative plate (insulating plate) disposed inside and a stiffness plate (so-called end plate) disposed outside. Alternatively, the end plate 4 may have a two-layer structure in which the insulative plate and the stiffness plate are integral with each other.

The joints 5 to 8 respectively serve to connect the supply inlets 17 and 19 and the discharge outlets 18 and 20 which are provided on the cell stack 2 to external pipes P (see FIG. 4). As shown in FIG. 3, the joints 5 to 8 are respectively attached to the supply inlets 17 and 19 and the discharge outlets 18 and 20. Among them, water condensation may occur in the joint 5 attached to the reaction gas supply inlet 17. As shown in FIG. 3, the joint 5 mainly includes a cell stack connecting portion 5a, an external pipe connecting portion 5b, and a tubular portion 5c. The cell stack connecting portion 5a is provided at a base end portion of the joint 5 and is connected to the reaction gas supply inlet 17 provided on the cell stack 2. The external pipe connecting portion 5b is provided at a tip end portion of the joint 5 and is connectable to the external pipe P (see FIG. 4). The tubular portion 5c is provided in a center region between the cell stack connecting portion 5a and the external pipe connecting portion 5b, forming the reaction gas passage. The joint 5 has been described here, and the joints 6 to 8 have the same structure as that of the joint 5. It is desirable that the joints 5 to 8 be formed of a material such as resin, having low heat conductivity. By using the material having low heat conductivity, water condensation which may be caused by thermal influence from outside can be suppressed. Whereas in Embodiment 1, the six joints 5 to 8 have the same structure, they may be altered to have, for example, a larger inner diameter, according to quality or flow rate of the fluid flowing in the joints 5 to 8.

As shown in FIG. 3, the closing member 9 has a flat plate shape and an annular shape. As shown in FIG. 1, the closing members 9 are respectively located inside the through-holes 23 of the end plate 4 and are respectively attached to surround the joints 5 to 8 (the closing members 9 are fitted to the joints 5 to 8 so that the joints 5 to 8 are inserted into the inner holes thereof). It is desired that the closing members 9 be formed of a material such as resin or wood, having low heat conductivity. Whereas in Embodiment 1, the closing members 9 are attached to all of the joints 5 to 8, the closing member 9 may be attached only to the joint 5 connected to the reaction gas supply inlet 17. The above is an outline of the fuel cell 1 of Embodiment 1.

Figure 4A:
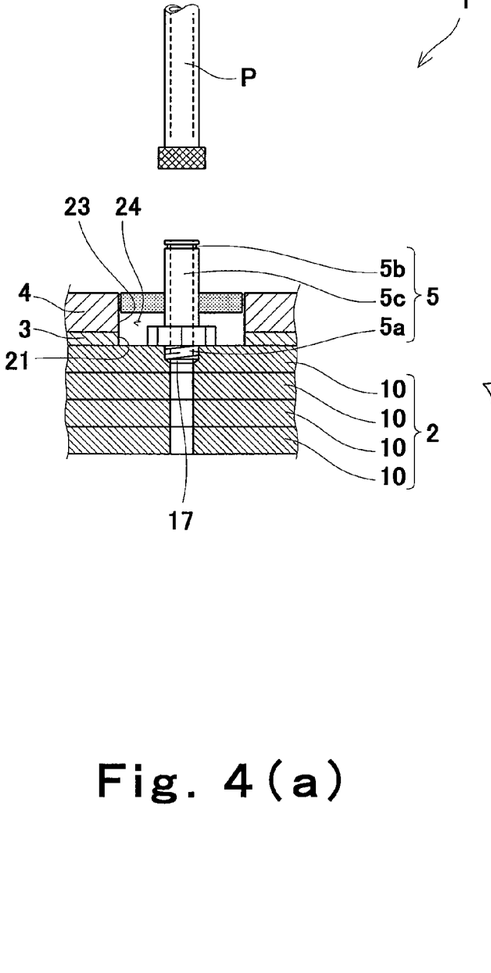
FIG. 4 is an enlarged view of a joint and its surrounding portion according to Embodiment 1.
Figure 4B:
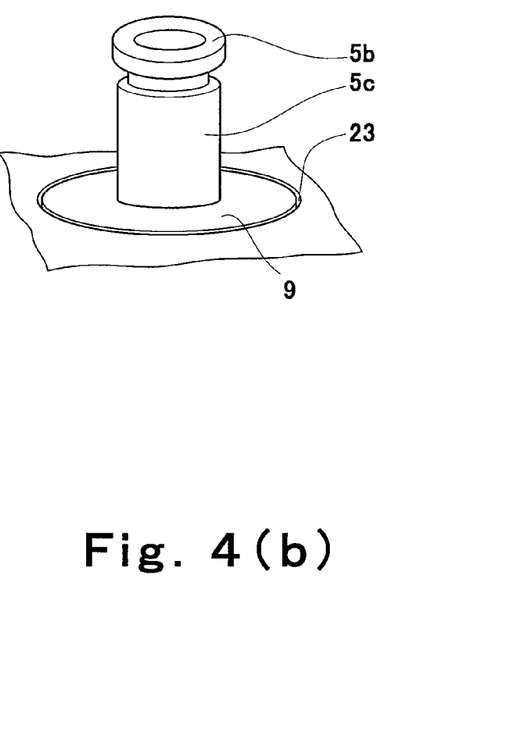

Subsequently, a structure of the joints 5 to 8 and their surrounding portions according to Embodiment 1 will be described in detail with reference to FIG. 4. FIG. 4 is an enlarged view of the joint 5 connected to the reaction gas supply inlet 17, and its surrounding portion, among the joints 5 to 8 according to Embodiment 1, in which FIG. 4(a) is a cross-sectional view and FIG. 4(b) is a perspective view. Here, the structure of the joint 5 connected to the reaction gas supply inlet 17 and its surrounding portion will be described. The joints 6 to 8 and their surrounding portions have the same structure. As shown in FIG. 4(a), a male thread is formed at the cell stack connecting portion 5a which is located at the base end portion of the joint 5, while a female thread is formed at the end surface of the cell stack 2 (outer surface of the separator in the cell 10 located at the outermost end). The male thread of the cell stack connecting portion 5a is threaded into the female thread of the cell stack 2, fastening the joint 5 to the end surface of the cell stack 2 such that the joint 5 protrudes outward therefrom.

The external pipe connecting portion 5b located at the tip end portion of the joint 5 is located outward relative to the end surface of the end plate 4 and is connectable to the external pipe P. In this embodiment, the external pipe connecting portion 5b has a structure for allowing the connecting portion 5b to be connected to the external pipe P by a one-touch operation. Note that other connecting mechanism may be used. For example, the external pipe connecting portion 5b may be connected to the external pipe P by threaded members.

The tubular portion 5c located at the center portion of the joint 5 has a structure in which a large part in the longitudinal direction is located inside the through-hole 23. The outer diameter of the tubular portion 5c is smaller than a side of the through-hole 21 of the current collector 3 or the inner diameter of the through-hole 23 of the end plate 24. In other words, the inner wall surfaces of the through-holes 21 and 23 surround the joints 5 with a gap between them. Therefore, as shown in FIG. 4(a), a gap 24 is formed between the joint 5 and the inner wall surfaces of the through-holes 21 and 23.

The closing member 9 is disposed such that an upper surface thereof is substantially coplanar with the outer surface of the end plate 4. Thereby, the closing member 9 closes the opening of the gap 24 formed between the joint 5 and the through-holes 21 and 23, forming a closing structure. With the closing structure, a substantially closing space is formed between the joint 5 and the through-holes 21 and 23. Although a gap is not substantially formed between the closing member 9 and the end plate 4 in the configuration of FIG. 4, some gap is permissible so long as convection of air inside the closing space and the outside air can be prevented.

The above is a structure of the fuel cell according to Embodiment 1. In Embodiment 1, since a substantial closed space is formed between the joint 5 and the through-hole 23 of the end plate 4, the air from outside can be blocked while heating the air inside the closed space by heat transmitted from the cell stack 24. For this reason, even during use in cold places, a temperature decrease of the joint 5 due to the outside air can be prevented and therefore the water condensation which would occur inside the joint 5 can be suppressed. By disposing the closing member 9 between the joint 5 and the end plate 4 without a gap, the joint 5 is supported by the closing member 9. As a result, stiffness of the joint 5 and its surrounding portion is improved.

Whereas in Embodiment 1, the joints 5 to 8 are directly connected to the cell stack 2, they may be connected to the current collector 3. In this case, the current collector 3 is not provided with the through-holes 21 and is in contact with the joints 5 to 8. Note that in this case, the wall surfaces of the through-holes 23 of the end plate 4 surround the joints 5 to 8 with a gap between them. Using a concept of an "end member" including a combination of the end plate (including an insulating plate) and the current collector as well as the end plate (insulating plate), the end member has the through-hole 23 into which the joint 5 is inserted with a gap in any of the above cases.

Embodiment 2

Figures 5A, 5B:
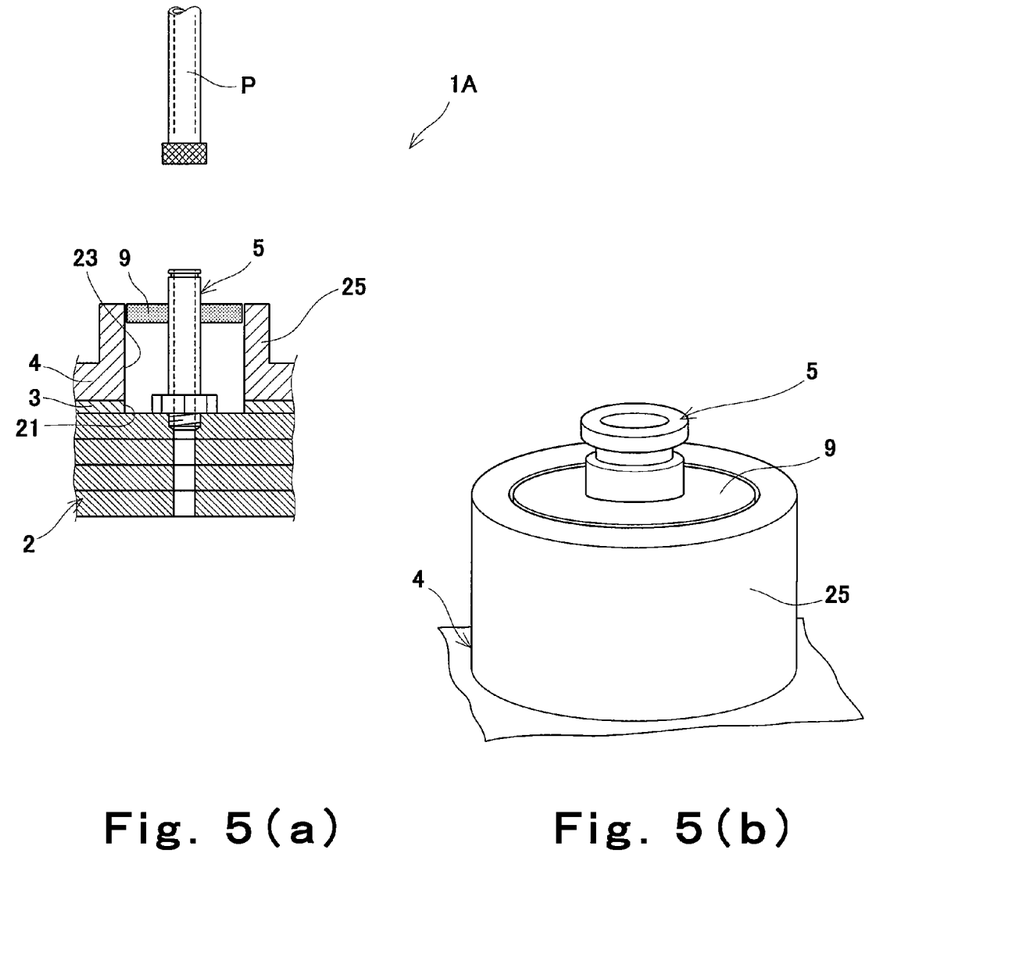
FIG. 5 is an enlarged view of a joint and its surrounding portion according to Embodiment 2.

Subsequently, a fuel cell 1A according to Embodiment 2 will be described with reference to FIG. 5. The fuel cell 1A according to Embodiment 2 has the same structure as that of the fuel cell 1 of Embodiment 1 except for the joint and its surrounding portion, and therefore the structure of the fuel cell 1A except for the joint and its surrounding portion will not be described. For the same reason, in Embodiments 3 to 5 described later, the structure of the fuel cell except for the joint and its surrounding portion will not be described. FIG. 5 is an enlarged view of the joint 5 connected to the reaction gas supply inlet 17 and its surrounding portion in the fuel cell 1A according to Embodiment 2, in which FIG. 5(a) is a cross-sectional view and FIG. 5(b) is a perspective view. Herein, the structure of the joint 5 connected to the reaction gas supply inlet 17 and its surrounding portion will be described. The same occurs in the joints 6 to 8 and their surrounding portions. FIG. 5 is a view corresponding to FIG. 4 which is referred to in Embodiment 1.

As shown in FIG. 5, the fuel cell 1A according to Embodiment 2 has substantially the same structure as that of the fuel cell 1 of Embodiment 1 but is different in structure from the fuel cell 1 of Embodiment 1 in that a surrounding portion 25 surrounding the through-hole 23 which is a part of the end surface of the end plate 4 protrudes outward (toward the tip end of the joint 5) in the fuel cell 1A of Embodiment 2. In accordance with the structure of the fuel cell 1A according to Embodiment 2, a substantially closed space formed between the joint 5 and the though-hole 23 of the end plate 4 can be made larger. In this closed space, a larger part of the joint 5 in the longitudinal direction is accommodated, reducing a region where water condensation occurs. For the same reason, it is desired that the surrounding portion 25 surrounding the through-hole 23 of the end plate 4 protrude outward to an extent which does not impede connection between the joint 5 and the external pipe P. Embodiment 2 is effective to the joint 5 which has a large height.

Embodiment 3

Figures 6A, 6B:
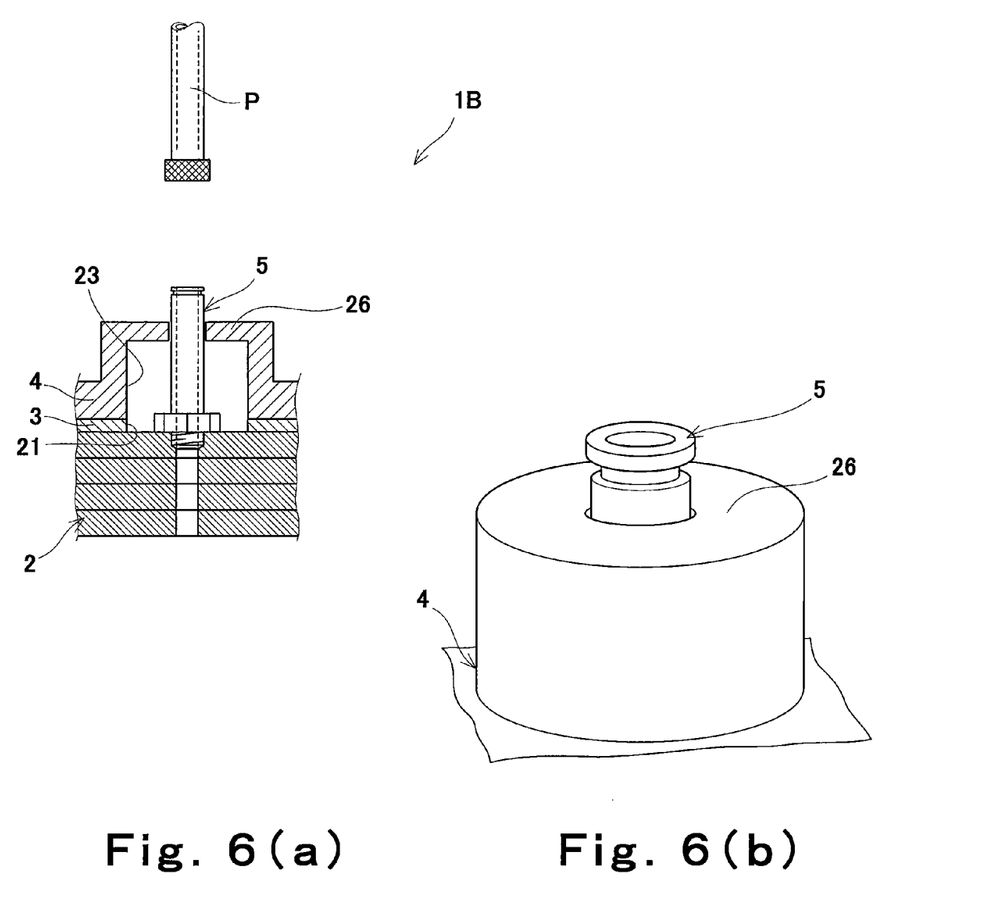
FIG. 6 is an enlarged view of a joint and its surrounding portion according to Embodiment 3.

Subsequently, a fuel cell according to Embodiment 3 will be described with reference to FIG. 6. FIG. 6 is an enlarged view of the joint 5 connected to the reaction gas supply inlet 17 and its surrounding portion in the fuel cell 1B according to Embodiment 2, in which FIG. 6(a) is a cross-sectional view and FIG. 6(b) is a perspective view. Herein, the structure of the joint 5 connected to the reaction gas supply inlet 17 and its surrounding portion will be described. The same occurs in the joints 6 to 8 and their surrounding portions. As shown in FIG. 6, the fuel cell 1B according to Embodiment 3 has substantially the same structure as that of the fuel cell 1A according to Embodiment 2 but is different in structure from the fuel cell 1A according to Embodiment 2 in that the fuel cell 1A according to Embodiment 2 includes the closing member 9, while the fuel cell 1B according to Embodiment 3 does not include the closing member 9 but instead the through-hole 23 of the end plate 4 has a small-diameter portion 26 having an inner diameter smaller than that of its surrounding portion. In other words, the fuel cell 1B according to Embodiment 3 is different in structure from the fuel cell 1A according to Embodiment 2 in that an opening portion of the through-hole 23 of the end plate 4 protrudes radially inward. In accordance with the structure of the fuel cell 1B according to Embodiment 3, since the small-diameter portion 26 serves as a closing structure, the closing member 9 may be omitted. As a result, the number of components and members and working steps of the fuel cell 1B can be reduced.

Embodiment 4

Figures 7A, 7B:
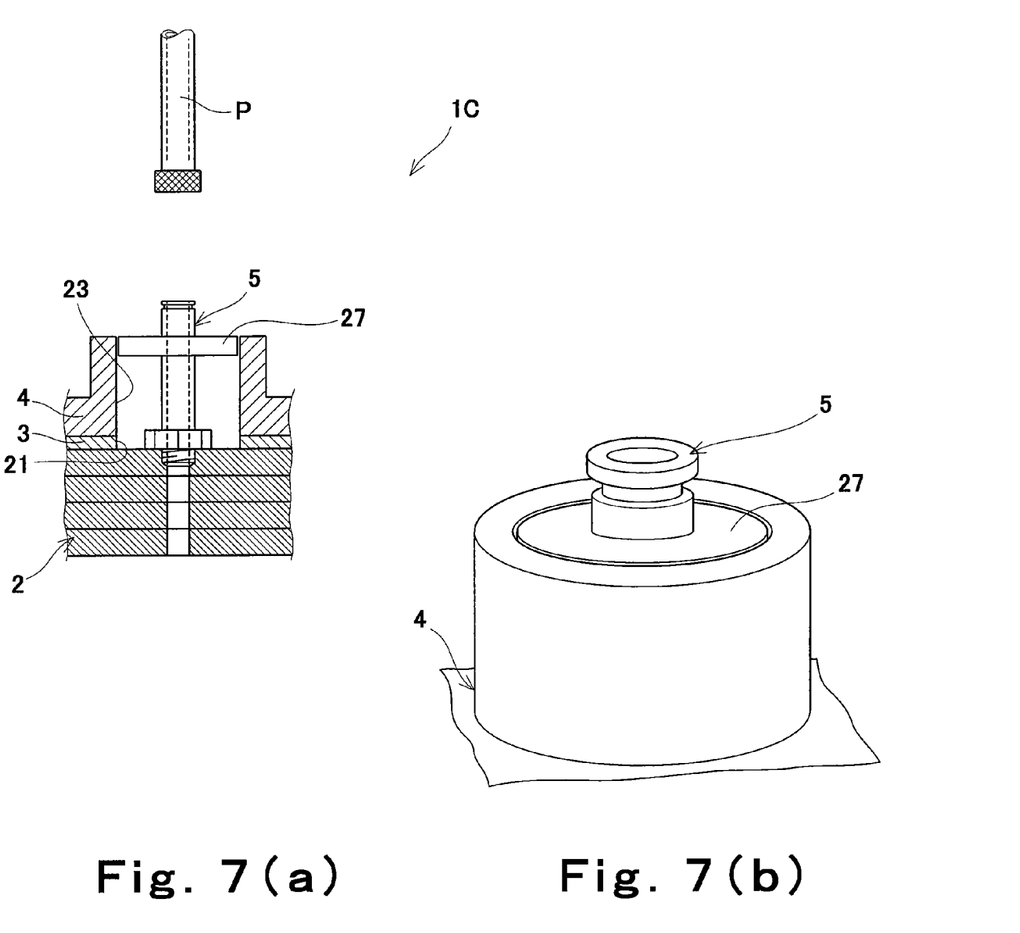
FIG. 7 is an enlarge view of a joint and its surrounding portion according to Embodiment 4.

Subsequently, a fuel cell 1C according to Embodiment 4 will be described with reference to FIG. 7. FIG. 7 is an enlarged view of the joint 5 connected to the reaction gas supply inlet 17 of the fuel cell 1C and its surrounding portion according to Embodiment 4, in which FIG. 7(a) is a cross-sectional view and FIG. 7(b) is a perspective view. Herein, the structure of the joint 5 and its surrounding portion connected to the reaction gas supply inlet 17 will be described. The same occurs in the joints 6 to 8 and their surrounding portions. As shown in FIG. 7, a fuel cell 1C according to Embodiment 4 has substantially the same structure as that of the fuel cell 1A according to Embodiment 2 but is different in structure from the fuel cell 1A according to Embodiment 2 in that the fuel cell 1A according to Embodiment 2 includes the closing member 9, while the fuel cell 1C according to Embodiment 4 does not include the closing member 9 but instead the joint 5 has a large-diameter portion 27 having a larger outer diameter than its surrounding portion. In other words, the fuel cell 1C according to Embodiment 4 is different in structure from the fuel cell 1A according to Embodiment 2 in that a portion of the joint 5 which is located in the opening portion of the through-hole 23 protrudes radially outward. In accordance with the structure of the fuel cell 1C according to Embodiment 4, since the large-diameter portion 27 serves as a closing structure, the closing member 9 may be omitted. As a result, the number of components and members and working steps of the fuel cell 1C can be reduced, as in the fuel cell 1B according to Embodiment 3.

Embodiment 5

Figure 8A:
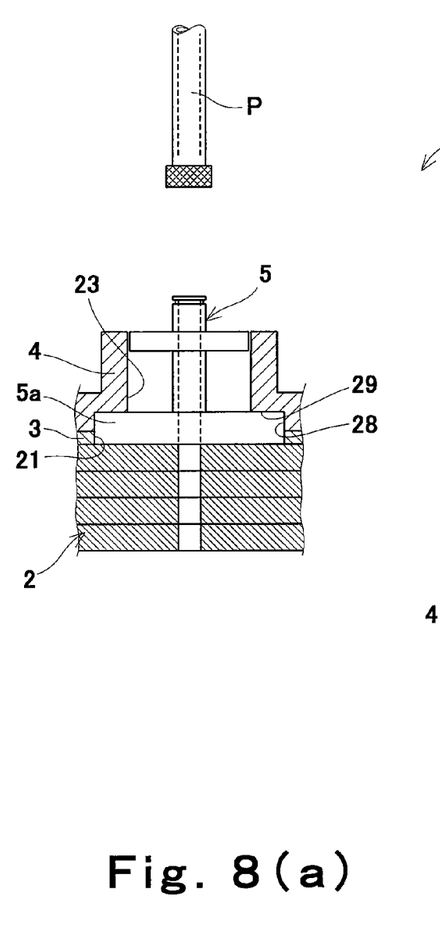
FIG. 8 is an enlarged view of a joint and its surrounding portion according to Embodiment 5.
Figure 8B:
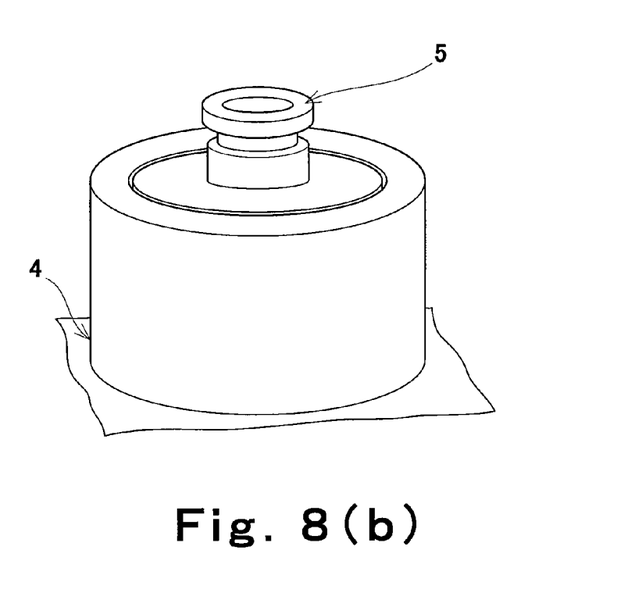

Subsequently, a fuel cell 1D according to Embodiment 5 will be described with reference to FIG. 8. FIG. 8 is an enlarged view of the joint 5 connected to the reaction gas supply inlet 17 and its surrounding portion in a fuel cell 1D according to Embodiment 5, in which FIG. 8(a) is a cross-sectional view and FIG. 8(b) is a perspective view. Herein, the structure of the joint 5 connected to the reaction gas supply inlet 17 and its surrounding portion will be described. The same occurs in the joints 6 to 8 and their surrounding portions. As shown in FIG. 8, the fuel cell 1D according to Embodiment 5 has substantially the same structure as that of the fuel cell 1C according to Embodiment 4 but is different in structure from the fuel cell 1C according to Embodiment 4 in that the cell stack connecting portion (base end portion) 5a has a male thread and the male thread is threaded into the cell stack 2 in the fuel cell 1C of Embodiment 4, while the cell stack connecting portion 5a has a flat-plate shape extending along the end surface of the cell stack 2 and is retained between the cell stack 2 and the end plate 4 in the fuel cell 1D according to Embodiment 5.

To be specific, the through-hole 21 of the current collector 3 is sized to be able to accommodate the cell stack connecting portion 5a of the joint 5 and an extended portion 28 is provided at the base end portion of the through-hole 23 of the end plate 4. A portion of the cell stack connecting portion 5a of the joint 5 which protrudes from the through-hole 21 of the current collector 3 is accommodated in the extended portion 28. The cell stack connecting portion 5a is accommodated in the extended portion 28 such that its main surface is pressed against a wall surface 29 of the end plate 4 forming a step surface of the extended portion 28. Between the cell stack connecting portion 5a of the joint 5, and the cell stack 2, the current collector 3, and the end plate 4 which are in contact with the surface of the cell stack connecting portion 5a, a seal member which is not shown is suitably provided.

In accordance with the structure of the fuel cell 1D according to Embodiment 5, an area of the joint 5 which is in contact with the cell stack 2 increases. Therefore, heat is easily transmitted from the cell stack 2 to the joint 5, and water condensation can be suppressed more effectively.

Whereas the cell stack connecting portion 5a of the joint 5 is directly sandwiched between the end plate 4 and the cell stack 2 in the structure of FIG. 8, it may be sandwiched between them via the current collector 3. That is, the cell stack connecting portion 5a may be directly sandwiched between the end plate 4 and the current collector 3 or between the current collector 3 and the cell stack 2. Furthermore, using the concept of the "end member" described in Embodiment 1, the cell stack connecting portion 5a is sandwiched between the cell stack 2 and the end member in any of the above cases.

Embodiment 6

Figures 9A, 9B:
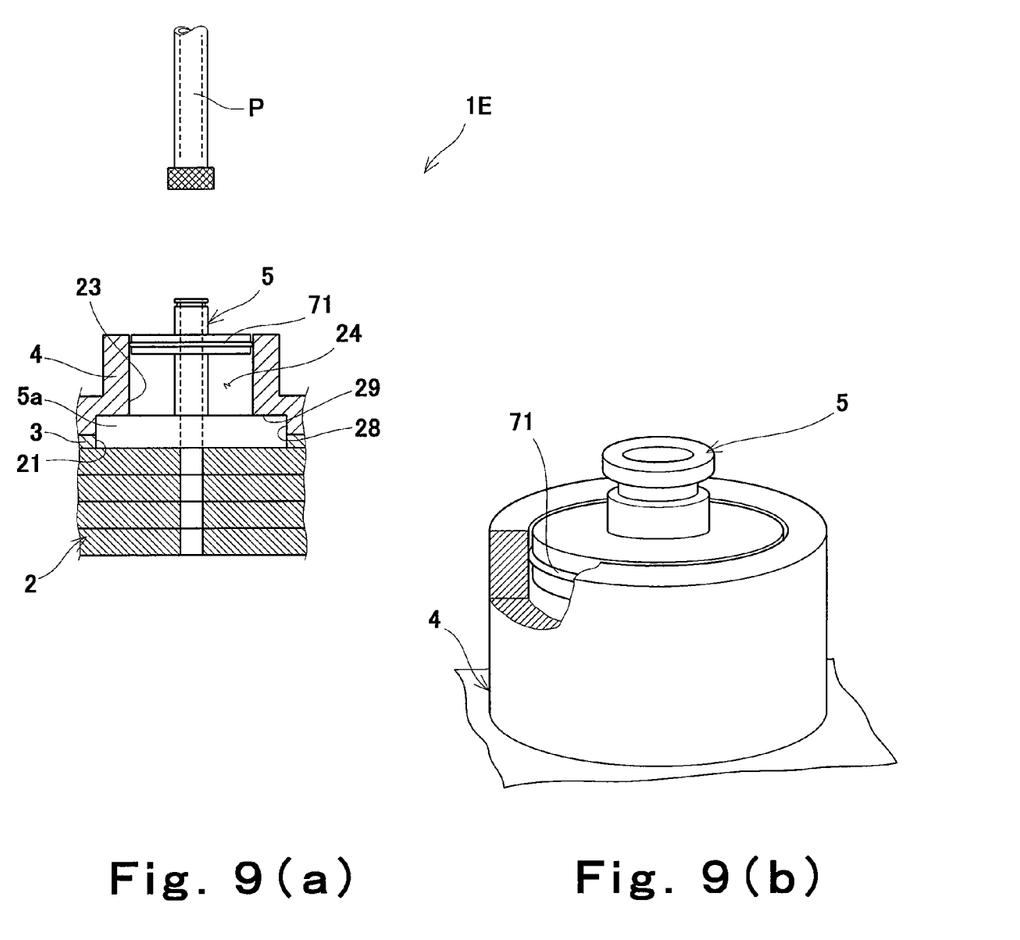
FIG. 9 is an enlarged view of a joint and its surrounding portion according to Embodiment 6.

Subsequently, a fuel cell 1E according to Embodiment 6 will be described with reference to FIG. 9. FIG. 9 is an enlarged view of the joint 5 connected to the reaction gas supply inlet 17 and its surrounding portion in a fuel cell 1E according to Embodiment 6, in which FIG. 9(a) is a cross-sectional view and FIG. 9(b) is a perspective view. Herein, the structure of the joint 5 connected to the reaction gas supply inlet 17 and its surrounding portion will be described. The same occurs in the joints 6 to 8 and their surrounding portions. As shown in FIG. 9, the fuel cell 1E according to Embodiment 6 has substantially the same structure as that of the fuel cell 1D according to Embodiment 5 but is different in structure from the fuel cell 1D according to Embodiment 5 in that the large-diameter portion 27 of the fuel cell 1D according to Embodiment 5 is in direct contact with the end plate 4, while a gas seal member 71 is provided between the large-diameter portion 27 and the end plate 4 in the fuel cell 1E according to Embodiment 6.

In accordance with the structure of the fuel cell 1E according to Embodiment 6, since the gas seal member 71 can completely isolate the air inside the gap 24 from the outside air, heat insulative ability can be further improved. When a vibration is applied to the fuel cell 1E, the gas seal member 71 serves as a buffering member. As a result, vibration resistance can be improved. As the material of the gas seal member 71 of Embodiment 6, a material, for example, fluorine-contained rubber, EPDM or silicon rubber, having elasticity and barrier property may be used.

Needless to say, the same advantage can be achieved, by providing a gas seal member between the joint 5 and the small-diameter portion 26 of the end plate 4 in Embodiment 3.

Figure 10:
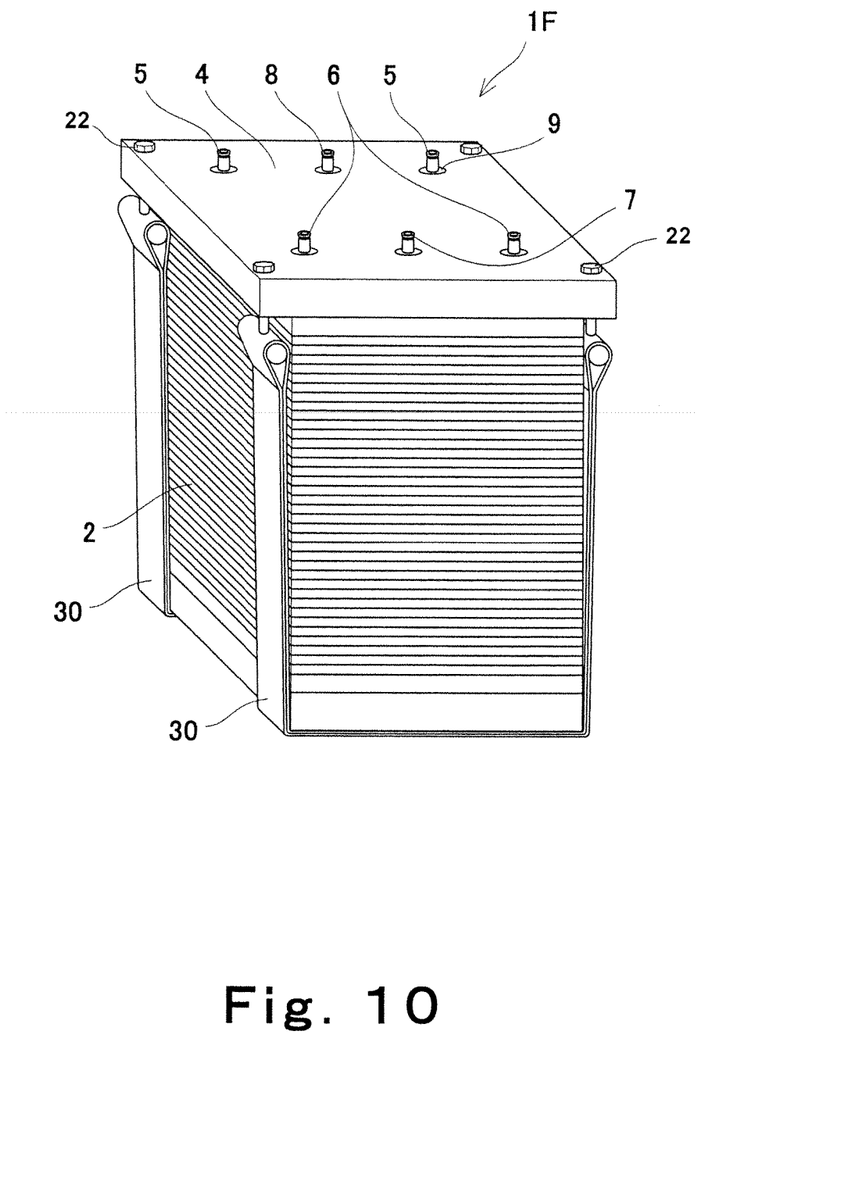
FIG. 10 is a schematic view of a fuel cell according to another embodiment.

Thus far, Embodiments 1 to 6 of the present invention have been described with reference to the drawings. The specific structure is not limited to those in these Embodiments. Alternation of a design or the like without departing from the scope of the invention may be included in the present invention. For example, a case where the bolts 22 are used as the fastener means for retaining the cell stack 2 and the current collectors 3 has been described (see FIG. 1 and FIG. 3). As shown in FIG. 10, the cell stack 2 may be fastened using a fastener band 30 having a small thickness as the fastener means. If the fastener band 30 is used as the fastener means, the fastener band 30 does not protrude greatly from the surface of the end plate 4. As a result, the size of the fuel cell 1F can be reduced. As the member of the fastener band 30, a material having high tension strength and high rust-proof property, such as resin (engineering plastic, elastomer, etc), stainless steel (SUS304, etc), or chrome molybdenum steel is used.

Industrial Applicability

A fuel cell of the present invention is useful as a fuel cell or the like including a reaction gas supply path which makes it difficult to cause water condensation in a region near an end plate.

The invention claimed is:
1. A fuel cell comprising:
a cell stack having a reaction gas passage inside thereof and having on one end surface thereof a reaction gas supply inlet from which a reaction gas is supplied to the reaction gas passage;
a joint connecting the reaction gas supply inlet to an external pipe for supplying the reaction gas;

a plate-shaped end member which is disposed on one end surface of the cell stack and has a through-hole into which the joint is inserted so as not to contact an inner wall surface thereof; and a closing structure forming a substantially closed space between the joint and the inner wall surface of the through-hole such that the joint and the through-hole are apart from each other.

2. The fuel cell according to claim 1, wherein a portion of the end member which surrounds the through-hole protrudes outward.

3. The fuel cell according to claim 1, further comprising:

a closing member formed annularly so as to surround the joint inside the through-hole, wherein the closing member forms the closing structure.

4. The fuel cell according to claim 1, wherein the through-hole has a small-diameter portion having an inner diameter smaller than an inner diameter of a portion of the through-hole which is other than the small-diameter portion, and the small-diameter portion forms the closing structure.

5. The fuel cell according to claim 1, wherein the joint has a large-diameter portion having an outer diameter larger than an outer diameter of a portion of the joint which is other than the large-diameter portion, and the large-diameter portion has the closing structure.

6. The fuel cell according to claim 1, wherein a base end portion of the joint has a flat-plate shape, and the base end portion is sandwiched between the cell stack and the end member.

7. The fuel cell according to claim 1, further comprising:

a gas seal member provided between the end member and the joint such that the gas seal member is located outward relative to the substantially closed space.

8. The fuel cell according to claim 1, wherein the substantially closed space has such an air-tightness that prevents convection of inside air of the substantially closed space and outside air.

* * * * *